(12) United States Patent
Georges et al.

(10) Patent No.: US 10,147,423 B2
(45) Date of Patent: Dec. 4, 2018

(54) CONTEXT-AWARE QUERY RECOGNITION FOR ELECTRONIC DEVICES

(71) Applicant: Intel IP Corporation, Santa Clara, CA (US)

(72) Inventors: Munir Nikolai Alexander Georges, Munich (DE); Georg Stemmer, Munich (DE); Joachim Hofer, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/280,809

(22) Filed: Sep. 29, 2016

(65) Prior Publication Data

US 2018/0090140 A1    Mar. 29, 2018

(51) Int. Cl.
*G10L 15/22* (2006.01)
*G10L 15/02* (2006.01)
*G10L 15/14* (2006.01)

(52) U.S. Cl.
CPC ............ *G10L 15/22* (2013.01); *G10L 15/02* (2013.01); *G10L 15/142* (2013.01); *G10L 2015/025* (2013.01); *G10L 2015/223* (2013.01)

(58) Field of Classification Search
CPC ......... G10L 15/22; G10L 17/00; G01C 21/00; G06N 5/046
See application file for complete search history.

(56) References Cited

U.S. PATENT DOCUMENTS

| 9,098,467 | B1 | 8/2015 | Blanksteen et al. | |
|---|---|---|---|---|
| 2008/0140306 | A1* | 6/2008 | Snodgrass | G01C 21/00 701/532 |
| 2009/0187402 | A1 | 7/2009 | Scholl | |
| 2009/0271203 | A1* | 10/2009 | Resch | G10L 15/26 704/275 |
| 2015/0213799 | A1 | 7/2015 | Han et al. | |
| 2015/0254058 | A1 | 9/2015 | Klein et al. | |
| 2016/0077794 | A1 | 3/2016 | Kim et al. | |
| 2016/0195856 | A1* | 7/2016 | Spero | G06N 5/046 700/90 |
| 2016/0284350 | A1* | 9/2016 | Yun | G10L 15/22 |
| 2017/0070783 | A1* | 3/2017 | Printz | G11B 27/022 |
| 2017/0206903 | A1* | 7/2017 | Kim | G10L 15/02 |

OTHER PUBLICATIONS

"International Application Serial No. PCT/US2017/048622, International Search Report dated Dec. 7, 2017", 3 pgs.
"International Application Serial No. PCT/US2017/048622, Written Opinion dated Dec. 7, 2017", 6 pgs.

\* cited by examiner

*Primary Examiner* — Pierre-Louis Desir
*Assistant Examiner* — Yi-Sheng Wang
(74) *Attorney, Agent, or Firm* — Schwegman Lundberg & Woessner, P.A.

(57) ABSTRACT

A method for context-aware query recognition in an electronic device includes receiving user speech from an input device. A speech signal is generated from the user speech. It is determined if the speech signal includes an action to be performed and if the electronic device is the intended recipient of the user speech. If the recognized speech signal include the action and the intended recipient of the user speech is the electronic device, a command is generated for the electronic device to perform the action.

25 Claims, 4 Drawing Sheets

CONTEXT-AWARE QUERY RECOGNITION FOR ELECTRONIC DEVICES

TECHNICAL FIELD

Embodiments described herein pertain in general to recognition and understanding of voice queries and in particular to providing context-aware queries of electronic devices.

BACKGROUND

Spoken Language Understanding (SLU) is a process by which a speech signal is interpreted to provide a human/computer interface. The recipient of a query is explicitly defined by the user. For example, when a user is talking to a computer, the user either pushes a button or begins the query with a dedicated phrase known to the computer (e.g., Hello Computer). Either the button or the dedicated phrase informs the computer that the next statement is assumed to be directed to the computer for recognition and interpretation. These are significant restrictions and design limitations for any human/computer interface.

DETAILED DESCRIPTION

Conventional human/computer interfaces use some form of indicating to the computer that the following conversation is actually a query meant for the computer. In one example, a dedicated wake-up phrase by the user may be spoken prior to the actual query. In another example, the user may have to push a button signaling to the computer that the conversation occurring while the button is depressed is a query meant for the computer to recognize and interpret. Such human/computer interfaces are limiting for the user who has to either push the button or remember to say the wake-up phrase prior to initiating the computer query.

The disclosed embodiments provide a way for the user to query an electronic device without a dedicated wake-up phase or signal button. Using speech detection and context-aware understanding of queries in conversational speech or text, the electronic device can determine the user's intent from the speech audio signal or text signal and act on the query. Such a method enables the user to speak in a more natural conversational way with the electronic device. In the following embodiments, the wake-up phrase may be defined as any speech or speech signal that the computer uses to determine that everything following that speech as being a query to be recognized by the computer.

As used herein, a "computer" may be any electronic device having the capability to receive a signal representing user conversation (e.g. an audio signal), determine what was said in the conversation using speech recognition, and interpret the conversation to determine if it was meant for the device. Such an electronic device may be a server, computer (e.g., having a central processing unit (CPU), memory, input/output), a kitchen appliance having an electronic controller, a control system in a vehicle, a personal electronic device, a home controller/security system, or any other electronic system having such capability.

Figure 1:
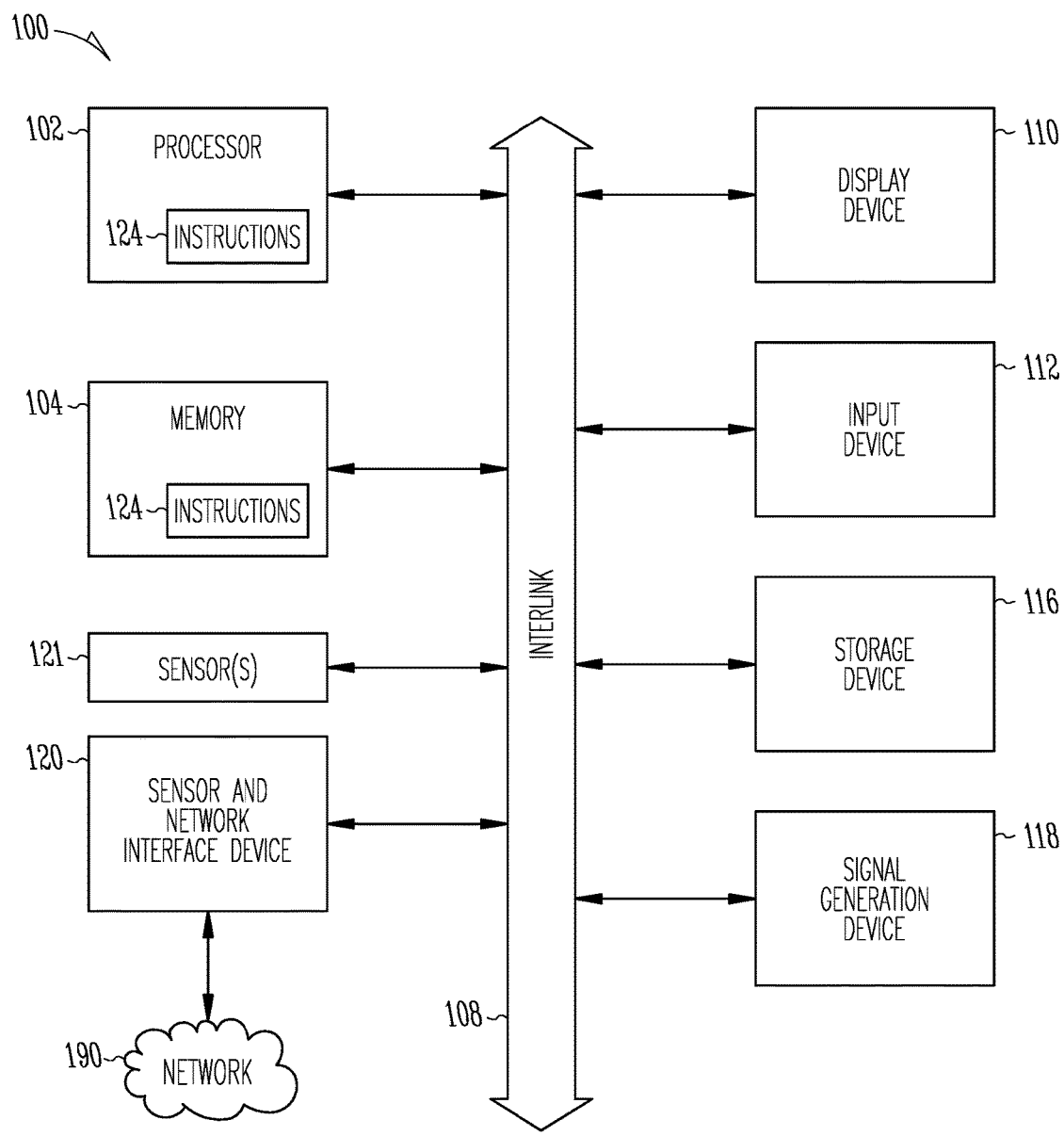
FIG. 1 illustrates an example of an electronic device for recognizing and interpreting speech signals, according to various embodiments.

FIG. 1 illustrates an example of an electronic device for recognizing and interpreting speech signals, according to various embodiments. The electronic device 100 may also be referred to as a computer or controller to execute any methods disclosed herein. This block diagram is for purposes of illustration only as other electronic devices may have different architectures and still be able to implement the context-aware query recognition method disclosed herein.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 102 may be configured by firmware or software (e.g., instructions, an application portion, or an application) as a module that operates to perform specified operations. In an example, the software may reside on a transitory or non-transitory computer readable medium. In an example, the software, when executed by the underlying hardware of the module, causes the hardware to perform the specified operations.

The electronic device 100 may include a hardware processor 102 (e.g., a central processing unit (CPU), a graphics processing unit (GPU), a hardware processor core, or any combination thereof), and memory 104. The various elements of the computer may communicate with each other over an interlink (i.e., bus) 108.

The electronic device 100 may further include a display unit 110 and an input device 112 (e.g., a keypad, keyboard, microphone) coupled to the interlink 108. In an example, the display unit 110 and the input device 112 together may be a touchscreen display. The touchscreen display may be incorporated in a tablet computer, smartphone device, kitchen appliance, personal electronics, or other such electronic device.

The electronic device 100 may additionally include a storage device (e.g., flash memory, random access memory (RAM), read only memory (ROM), magnetic disk drive, optical disk drive) 116, a signal generation device 118 (e.g., a speaker), a sensor and network interface device 120, and one or more sensors 121. The sensors 121 may include imaging sensors for determining the location of the user with respect to the electronic device or any movements or gesturing performed by the user. The sensors 121 may further include biometric sensors (e.g., finger print, retina data, voice recognition) for determining a user's identity. If the sensors are coupled to the electronic over a wireless channel, the sensor and network interface device 120 may include the necessary radio(s) to communicate with the sensors.

The memory 104 may include at least one transitory or non-transitory computer-readable medium on which is stored one or more sets of data structures or instructions 124 (e.g., software) embodying or utilized by any one or more of the techniques, methods, or functions described herein. The instructions 124 may also reside, at least partially, in additional computer-readable memories such as within the hardware processor 102 during execution thereof by the system 100. In an example, one or any combination of the hardware processor 102, the memory 104 or the mass storage device 116 may constitute non-transitory computer-readable media.

The network interface device 120 may also be a sensor interface and include any wired or wireless interface, such as a radio, for reading sensors over a wireless channel. The radio may operate using a Bluetooth®, an IEEE 802.11 standard, or any other standard for reading data from sensors over a wireless channel. The network may be a peer-to-peer network, a local area network (LAN), or a wide area network (WAN) including the Internet.

Figure 2:
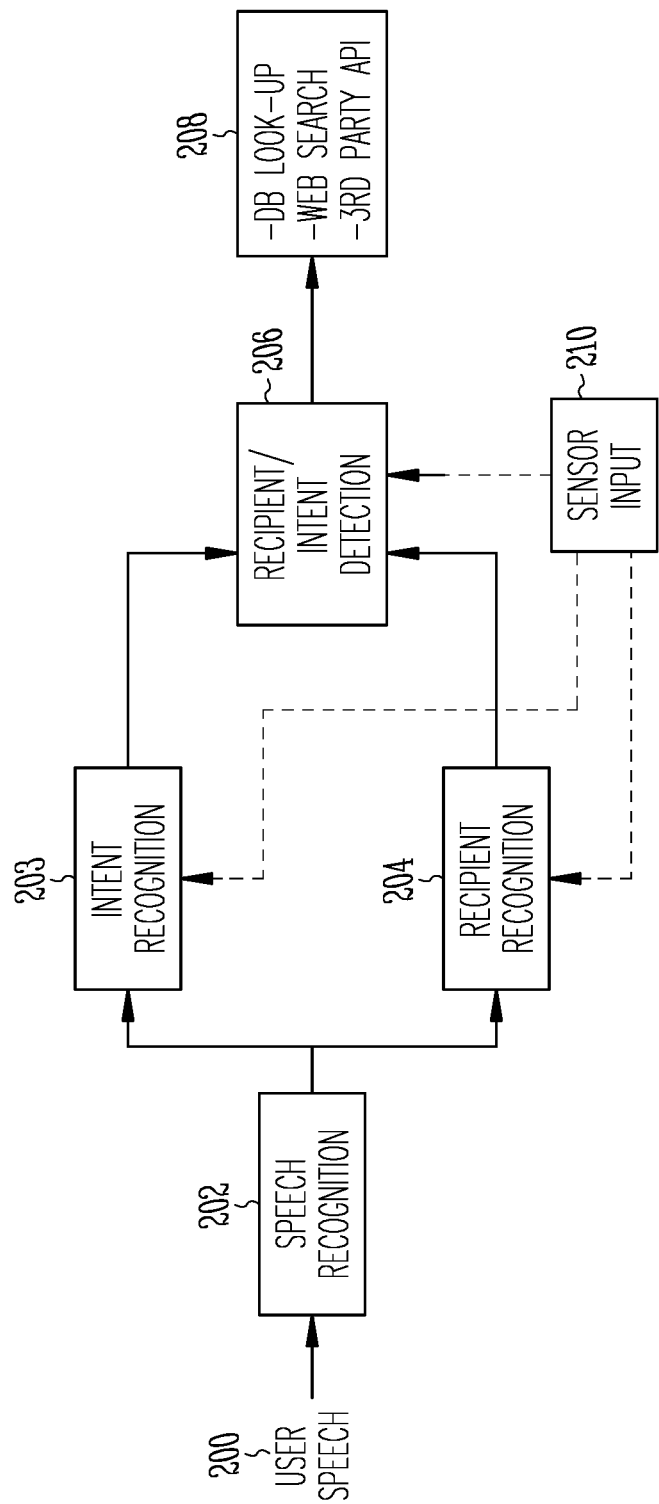
FIG. 2 illustrates a flow diagram of a method for context-aware query recognition in the electronic device, according to various embodiments.

FIG. 2 illustrates a flow diagram of a method for context-aware query recognition in an electronic device, according to various embodiments. The execution of the various blocks of the method may all be performed by the electronic device, distributed amongst multiple electronic devices, distributed amongst one or more electronic devices and one or more servers over an Internet connection, or the entire execution may be performed by the one or more servers over the Internet connection.

Since the method for context-aware query recognition monitors all of the speech from the user, transmitting the conversation over the Internet may result in privacy concerns. One way to avoid such issues is for the electronic device receiving the user speech 200 to encrypt the transmission of the speech prior to transmission over the Internet connection. The encryption may be built into any one of the blocks 200, 202, 203, 204, 206 of FIG. 2 depending upon which part of the method is executed in the electronic device and which part is executed by the Internet server.

Speech recognition 202 is used to identify the words in the user's conversation 200. The user's conversation may be received by a microphone 112 as shown in the electronic device of FIG. 1. The speech recognition may be speaker dependent (e.g., needing training of the user's voice) or speaker independent (e.g., not needing training of the user's voice). The user speech does not need to include a wake-up phrase for operation of the method for context-aware query recognition.

The speech recognition 202 may be performed over a context window that defines a particular time period over which the speech recognition 202 assumes that the user's query is still occurring. The context window may be defined by a particular time period (e.g., 5 seconds) over which the user is speaking or when the user is silent for a particular time period (e.g., 1 second) after a speech signal is received.

The speech recognition 202 may use acoustic modeling and/or language modeling in a statistically-based speech recognition algorithm to generate a recognized speech signal in response to the user speech 200. For example, a Hidden-Markov Model (HMM) may be used as the algorithm for speech recognition 202. The HMM is only one example of a speech recognition algorithm 202. Other embodiments may use other ways to perform the speech recognition. The recognized speech signal does not need to include the wake-up phrase for operation of the method for context-aware query recognition.

The HMM is a statistical model that outputs a sequence of symbols or quantities as a piecewise stationary signal or a short-time stationary signal. In a short time-scale (e.g., 10 milliseconds), speech can be approximated as a stationary process. In speech recognition, the HMM outputs a sequence of n-dimensional real-valued vectors (with n being a relatively small integer, such as 40) every 10 milliseconds. The vectors may consist of cepstrum coefficients that are obtained by taking a Fourier transform of a short time window of the user's speech 200 and decorrelating the spectrum using a cosine transform, then using the first (most significant) coefficients. Several of those feature vectors may be combined together in order to get longer temporal contexts, e.g. by estimating derivatives (deltas and delta-deltas) or by simply stacking the features together. Usually, feature vectors of 5 to 50 frames may be combined to form a super vector in this fashion. The HMM tends to have a statistical distribution in each state that may be modeled by a Gaussian mixture model (GMM), a deep neural network (DNN), a recurrent neural network (RNN), a long-short term memory network (LSTM) or any other type of statistical approach for each observed super vector.

As used herein, a "word" may be represented by a numerical vector. A sequence of words (e.g., a sentence) may be represented in a graphical way (e.g., as a lattice). Each word or, for more general speech recognition systems, each phoneme or each sub-phonetic unit, that may or may not be depend on the context of surrounding phonemes, may have a different output distribution. An HMM for a sequence of words or phonemes is made by concatenating the individual trained HMMs for the separate words and phonemes. In some embodiments, the concatenated HMMs may be represented by a graph, for example a weighted finite state transducer (WFST). The probability of different sequences of words may be modelled by a grammar or a statistical language model. The statistical language model may be represented by word n-grams or recurrent neural networks (RNN).

The speech signal (e.g., voiced audio signal, words and/or phonemes from a Speech Recognition 202 process) is input into parallel processing of Intent Recognition 203 and Recipient Recognition 204. In order to reduce the latency time and, thus, the time required for the electronic device to act on the query, the Intent Recognition 203 and the Recipient Recognition 204 are performed substantially simultaneously (e.g., in parallel).

The Intent Recognition 203 determines the user's intent based on the words and/or phonemes of the speech signal. This can be a sequence of words and/or phonemes but also lattices, n-best lists or other suitable data structure. It may also include other features like word confidences or word timing information. An example method for performing the Intent Recognition 203 is shown in FIG. 3.

Figure 3:
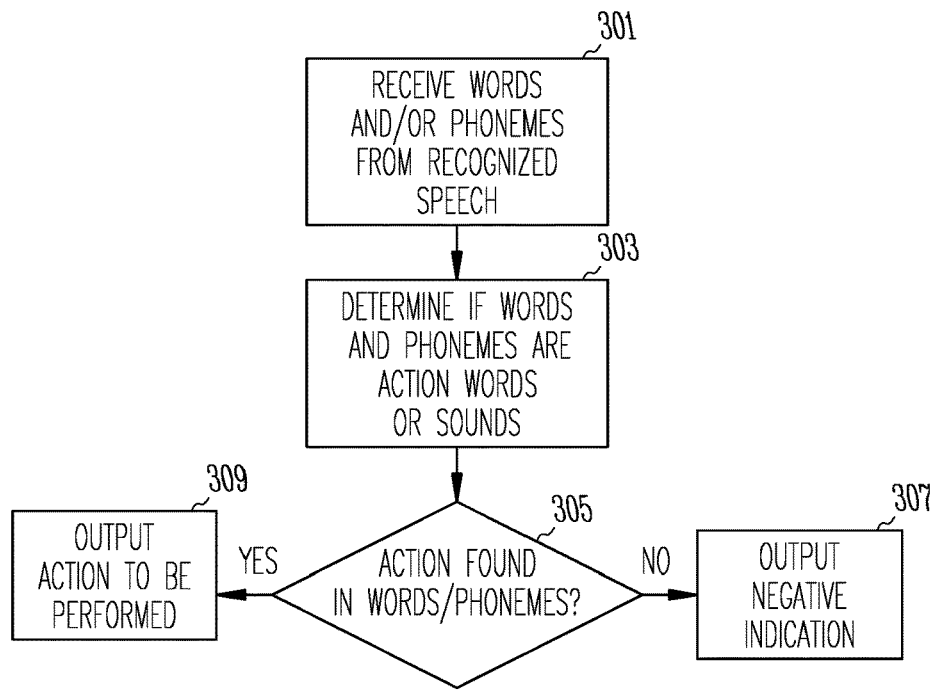
FIG. 3 illustrates a flow diagram of a method for Intent Recognition, according to various embodiments.

FIG. 3 illustrates a flow diagram of a method for Intent Recognition, according to various embodiments. In block 301, the Intent Recognition 203 receives the recognized speech signal from the speech recognition algorithm 202. In block 303, the Intent Recognition 203 processes the words and/or phonemes of the recognized speech signal to determine what the user wants to accomplish.

For example, the Intent Recognition 203 may process the words and/or phonemes to determine, in block 305, if the words or sounds implying some action (e.g., make, open, close, turn on, turn off, move, search, reply, increase, decrease). The Intent Recognition 203 may look for certain key words and the relationship between those words in a sentence. This can be done by machine learning given training data where the words and/or phonemes are annotated by certain intents. Thus, the Intent Recognition 203 uses the words and/or phonemes to determine if the user's speech requests some action to be performed. A machine learning algorithm (e.g., a condition random field, hidden Markov Models, Deep Neuronal Networks, Recurrent Neuronal Networks). The input to the machine learning algorithm may be vectors that represent the words and the words' positions in the input sentence. The output of the machine learning is the intent represented by the sentence. For example, if the user states "It is too warm in here", the intent of the sentence is to "turn down" or "turn off" the heating.

As used herein, an "action" may be defined as one action or multiple actions. For example, "brew coffee and put milk in the coffee" may be defined as "an action".

In block 309, if the recognized speech signal comprises some intents, the action to be performed by the intent is output. In block 307, if the recognized speech signal does not contain any intents, a negative indication is output to indicate to the Recipient and Intent Detection 206 that no action was intended by the user.

Referring again to FIG. 2, the Recipient Recognition 204 determines who or what is the intended recipient of the user's speech 200. In other words, the Recipient Recognition 204 determines if the user is speaking to the electronic device or if the user is speaking to another person in the room.

Figure 4:
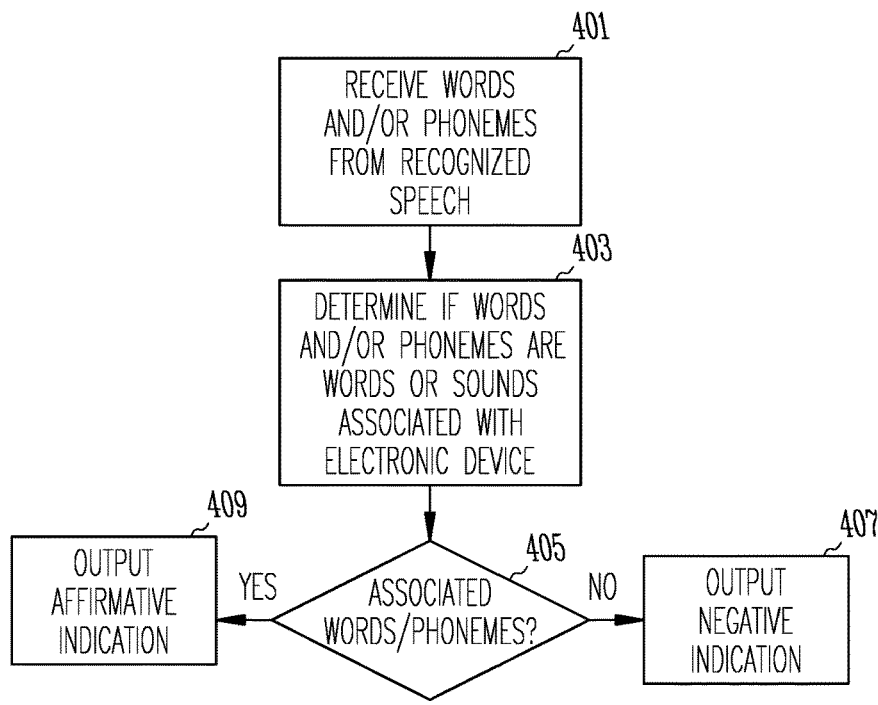
FIG. 4 illustrates a flow diagram of a method for Recipient Recognition, according to various embodiments.

FIG. 4 illustrates a flow diagram of a method for Recipient Recognition, according to various embodiments. In block 401, the Recipient Recognition 204 receives speech features (e.g. Mel Frequency Cepstral Coefficients (MFCCs)), words and/or phonemes from the captured speech signal. In block 403, the Recipient Recognition 204 processes the features, words and/or phonemes to determine, in block 405, if any features, words or sounds typically associated with the electronic device are in the speech signal. For example, a "wake on voice" technology may be used to detect special trigger words or word sequences. Machine learning can be applied to learn it given an audio signal. Some features (e.g. MFCC features) may be computed and used for calculations (e.g., phoneme probabilities using neuronal networks). A Gaussian Mixture Model may be used to represent and classify recipients of the speech. Some of these computational steps may be shared across modules (e.g., with the Speech Recognition 202).

For example, if the electronic device is a coffee maker, the coffee maker controller processes the words and/or phonemes to determine if the words or sounds for "coffee", "cup", "make", or any other direct or indirect related words or sounds associated with making coffee are present in the recognized speech signal. For example, a direct relation may be the user stating "make a cup of coffee" while an indirect relation may be the user stating "it would be nice to get a cup of coffee". In another example, if the electronic device is a home automation controller, the home controller processes the words and/or phonemes to determine if any words or sounds are present that are associated with something that the home controller is able to control (e.g., light, window, door, alarm).

In block 409, the Recipient Recognition 204 outputs an affirmative indication that the user's intent is for the recognized speech to be used by the electronic device if words, sounds or intents associated with the electronic device are recognized in the processed speech signal. In block 407, the Recipient Recognition 204 outputs a negative indication or no indication if the user's intent is for the speech signal to be used by something or someone other than the electronic device. The negative indication may include a set of probabilities (e.g., probabilistic indication) that the speech signal is to be used by something or someone other than the electronic device (e.g., P(recipient|speech signal)).

Figure 5:
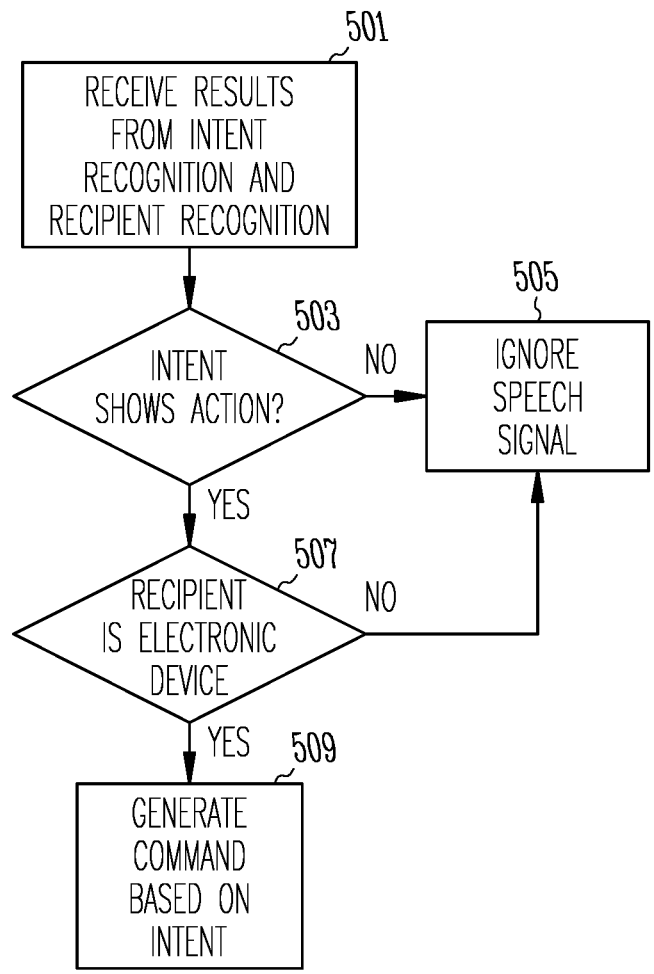
FIG. 5 illustrates a flow diagram of a method for Recipient and Intent Detection, according to various embodiments.

FIG. 5 illustrates a flow diagram of a method for Recipient and Intent Detection 206, according to various embodiments. In block 501, the Recipient and Intent detection 206 receives the results of the Intent Recognition 203 and the Recipient Recognition 204. In block 503, it is determined if the Intent Recognition 203 indicates some kind of action to be performed. If no action is indicated, the recognized speech is ignored in block 505.

If the Intent Recognition 203 indicates an action to be performed, block 507 determines if the electronic device is the intended recipient of the user speech, based on the output of the Recipient Recognition 204. If the intended recipient is not intended to be the electronic device, based on receiving the negative indication (see block 407 of FIG. 4) the recognized speech is ignored in block 505. If the electronic device is the intended recipient of the user speech, based on receiving the affirmative indication (see block 409 of FIG. 4), a command to perform the action is generated, in block 509.

For example, if the electronic device is a coffee maker and the Intent Recognition 203 determines that the user's speech indicates a desire for a cup of coffee to be made and the Recipient Recognition 204 determines that the user was talking to the electronic device, the Recipient and Intent Detection 206 outputs instructions to make the cup of coffee. In another example, if the electronic device is a home automation controller and the Intent Recognition 203 determines that the user's speech indicates a light to be turned off and the Recipient Recognition 204 determines that the user was talking to the electronic device, the Recipient and Intent Detection 206 outputs instructions to turn the light off.

One or more of the Intent Recognition 203, Recipient Recognition 204, and/or Recipient and Intent Detection 206 may optionally include an input from an external sensor 210 (e.g., imaging, biometric, keyboard, keypad, touchscreen, speaking position and/or speaking direction). This enables the electronic device to input text, images, or biometric sensor data into the method. Thus, if the method determines that the user is moving towards the electronic device or gesturing towards the electronic device, that may be an indication of the user's intent.

Referring again to FIG. 2, the command or instructions output from the Recipient and Intent Detection 206 is input to one or more of a dialog engine, database look-up routine, a World Wide Web (WWW) search engine, or a third party application program interface (API) 208 (e.g., motor control or some other machine-type action). For example, if the user query is determined to have been asking a question of the electronic device, the electronic device can determine the question and pass the question to a database look-up routine. The database look-up routine may access a database within the electronic device or a database located over an Internet connection. Another embodiment may compute the command or instructions to determine the recipient and the recipient re-processes the audio/features/signal for their own use (e.g., to compute some application specific classes) or the command/instructions may be processed in the cloud to incorporate other knowledge sources.

If the electronic device does not contain the desired information, the command or instructions may be passed, over an Internet connection, to a WWW search engine, a dialog search engine, or a chat-bot. The WWW search engine may then perform the search and return the search results to the electronic device to be displayed or read to the user using a synthetic voice. The electronic device may also respond with a request for clarification of user-action. The electronic device may also respond with a request for additional information or actions on the part of the user when the recipient/intent combination is understood but cannot be processed due to some known circumstances. For example, the electronic device may answer: "Got it, if you would like a coffee, please empower the coffee machine!" In other words, the device recognizes the intent/recipient but also recognizes the fact that the coffee machine is, for whatever reason, out of service and not responding.

If the recognized speech signal contains a request for an action be performed, the command or instruction may be passed to the third party API that is responsible for performing that task. For example, if the recognized speech signal requested a cup of coffee to be made, the third party API may be the interface from the electronic device controller and the mechanism to control the flow of water into the coffee maker as well as the brewing time selectable by the user.

Additional Notes & Examples

Example 1 is an electronic device to execute a context-aware query recognition, the device comprising: an input device to receive user speech, memory to store instructions for performing a context-aware query; and a controller, coupled to the memory and the input device, to generate a speech signal in response to the user speech, determine if the speech signal comprises an action to be performed, determine an intended recipient of the user speech, and if the speech signal comprises the action and the intended recipient of the user speech is the electronic device, generate a command for the electronic device to perform the action, wherein the user speech and the speech signal do not include a wake-up phrase.

In Example 2, the subject matter of Example 1 optionally includes a sensor coupled to the controller to generate a sensor input to the controller.

In Example 3, the subject matter of Example 2 optionally includes wherein the sensor comprises at least one of an image sensor to generate image data, an audio sensor to receive the user speech, or a biometric sensor to generate biometric sensor data.

In Example 4, the subject matter of Example 3 optionally includes wherein the controller is further to determine the intended recipient based on at least one of the image data or the biometric sensor data.

In Example 5, the subject matter of any one or more of Examples 3-4 optionally include wherein the controller is further to determine if the speech signal comprises the action to be performed based on at least one of the image data or the biometric sensor data.

In Example 6, the subject matter of any one or more of Examples 1-5 optionally include wherein the controller is further to perform a database search based on the command.

In Example 7, the subject matter of any one or more of Examples 1-6 optionally include wherein the controller is further to perform at least one of a World Wide Web search based on the command, input the command to a dialog engine, or input the command to a chat-bot.

In Example 8, the subject matter of any one or more of Examples 1-7 optionally include wherein the controller is further to pass the command to an application program interface for execution.

In Example 9, the subject matter of any one or more of Examples 1-8 optionally include wherein the electronic device is a kitchen appliance, a computer, a control system in a vehicle, a personal electronic device, or a home controller.

Example 10 is a computer-implemented method for context-aware query recognition in an electronic device, the method comprising: receiving user speech from an input device; generating a speech signal in response to the user speech, wherein the user speech and the speech signal do not include a wake-up phrase; determining if the speech signal comprises an action to be performed; determining an intended recipient of the user speech; and if the speech signal comprises the action and the intended recipient of the user speech is the electronic device, generating a command for the electronic device to perform the action.

In Example 11, the subject matter of Example 10 optionally includes receiving a sensor input comprising an image, audio or biometric data.

In Example 12, the subject matter of Example 11 optionally includes determining if the speech signal comprises the action based on the sensor input.

In Example 13, the subject matter of any one or more of Examples 11-12 optionally include determining the intended recipient of the user speech based on the sensor input.

In Example 14, the subject matter of any one or more of Examples 10-13 optionally include wherein determining if the speech signal comprises the action to be performed comprises: receiving at least one of words or phonemes from the speech signal; determining if the words or the phonemes are action words or sounds; and outputting the action to be performed if the words or the phonemes comprise the action to be performed.

In Example 15, the subject matter of Example 14 optionally includes outputting a negative or a probabilistic indication if the words or the phonemes do not comprise the action to be performed.

In Example 16, the subject matter of any one or more of Examples 10-15 optionally include wherein determining the intended recipient of the user speech comprises: receiving at least one of words or phonemes from the speech signal; determining if the words or the phonemes are associated with the electronic device; and if the words or phonemes are associated with the electronic device, outputting the an affirmative indication that the intended recipient of the user speech is the electronic device.

In Example 17, the subject matter of Example 16 optionally includes if the words or phonemes are not associated with the electronic device, outputting a negative indication.

Example 18 is at least one computer-readable medium comprising instructions for executing context-aware query recognition that, when executed by a computer, cause the computer to perform any one of the method Examples 10-17.

Example 19 is an apparatus comprising means for performing any of the methods of Examples 10-17.

Example 20 is a computer-implemented method for context-aware query recognition in an electronic device, the method comprising: receiving user speech from an input device; generating a speech signal in response to the user speech, wherein the user speech and the speech signal do not include a wake-up phrase; and if the user speech comprises at least one of words or phonemes indicating that the user speech was intended for the electronic device and the speech signal comprises an action, generating a command based on the action.

In Example 21, the subject matter of Example 20 optionally includes forwarding the command to an application programming interface to execute the command in one of a kitchen appliance, a computer, a control system in a vehicle, a personal electronic device, or a home controller.

In Example 22, the subject matter of any one or more of Examples 20-21 optionally include transmitting the command over an Internet connection to a server for performing a database search or a World Wide Web search.

Example 23 is at least one computer-readable medium comprising instructions for executing context-aware query recognition that, when executed by a computer, cause the computer to perform any one of the method Examples 20-22.

Example 24 is an apparatus comprising means for performing any of the methods of Examples 20-22.

Example 25 is at least one computer-readable medium comprising instructions for executing context-aware query recognition in an electronic device that, when executed by a computer, cause the computer to: receive user speech from an input device, generate a speech signal in response to the user speech, wherein the user speech and the speech signal do not include a wake-up phrase; determine if the speech signal comprises an action to be performed; determine an intended recipient of the user speech; and if the speech signal comprises the action and the intended recipient of the user speech is the electronic device, generate a command for the electronic device to perform the action.

In Example 26, the subject matter of Example 25 optionally includes wherein, when the instructions cause the computer to determine if the speech signal comprises the action to be performed, the instructions cause the computer to: receive at least one of words or phonemes from the speech signal; determine if the words or the phonemes are action words or sounds; and output the action to be performed if the words or the phonemes comprise the action to be performed.

In Example 27, the subject matter of any one or more of Examples 25-26 optionally include wherein, when the instructions cause the computer to determine the intended recipient of the user speech, the instructions cause the computer to: receive at least one of words or phonemes from the speech signal; determine if the words or the phonemes are words or sounds associated with the electronic device; and if the words or phonemes are associated with the electronic device, output an affirmative indication that the intended recipient of the user speech is the electronic device.

In Example 28, the subject matter of Example 27 optionally includes wherein the instructions further cause the computer to determine the intended recipient of the user speech based on a sensor input.

In Example 29, the subject matter of Example 28 optionally includes wherein the instructions further cause the computer to determine the intended recipient of the user speech based on images from the sensor input.

Example 30 is an electronic device to execute a context-aware query recognition, the device comprising: means for receiving user speech from an input device; means for generating a speech signal in response to the user speech, wherein the user speech and the speech signal do not include a wake-up phrase; means for determining if the speech signal comprises an action to be performed; means for determining an intended recipient of the user speech; and means for generating a command for the electronic device to perform the action when the speech signal comprises the action and the intended recipient of the user speech is the electronic device.

In Example 31, the subject matter of Example 30 optionally includes means for receiving a sensor input comprising an image or biometric data.

In Example 32, the subject matter of Example 31 optionally includes means for determining if the speech signal comprises the action based on the sensor input.

In Example 33, the subject matter of any one or more of Examples 31-32 optionally include means for determining the intended recipient of the user speech based on the sensor input.

In Example 34, the subject matter of any one or more of Examples 30-33 optionally include wherein means for determining if the speech signal comprises the action to be performed comprises: means for receiving at least one of words or phonemes from the speech signal; means for parsing the words or the phonemes for action words or sounds; and means for outputting the action to be performed if the words or the phonemes comprise the action to be performed.

In Example 35, the subject matter of Example 34 optionally includes means for outputting a negative indication if the words or the phonemes do not comprise the action to be performed.

In Example 36, the subject matter of any one or more of Examples 30-35 optionally include wherein the means for determining the intended recipient of the user speech comprises: means for receiving at least one of words or phonemes from the speech signal; means for parsing the words or the phonemes for words or sounds associated with the electronic device; and means for outputting the an affirmative indication that the intended recipient of the user speech is the electronic device when the words or phonemes are associated with the electronic device.

In Example 37, the subject matter of Example 36 optionally includes means for outputting a negative indication when the words or phonemes are not associated with the electronic device.

Example 38 is an electronic device to execute context-aware query recognition, the device comprising: means for receiving user speech from an input device; means for generating a speech signal in response to the user speech, wherein the user speech and the speech signal do not include a wake-up phrase; and means for generating a command based on the action when the user speech comprises at least one of words or phonemes indicating that the user speech was intended for the electronic device and the speech signal comprises an action.

In Example 39, the subject matter of Example 38 optionally includes means for forwarding the command to an application programming interface to execute the command in one of a kitchen appliance, a computer, a control system in a vehicle, a personal electronic device, or a home controller.

In Example 40, the subject matter of any one or more of Examples 38-39 optionally include means for transmitting the command over an Internet connection to a server for performing a database search or a World Wide Web search.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic device to execute a context-aware query recognition, the device comprising:
   an input device to receive user speech;
   memory to store instructions for performing a context-aware query; and
   a controller, coupled to the memory and the input device, the controller being configured to:
   generate a speech signal including applying the user speech to a statistically-based speech recognition algorithm,
   determine, using a first machine learning process employing at least one of a condition random field, hidden Markov model, or neural network, if the speech signal includes words implying an action and whether the words implying the action request the action to be performed,
   determine, using a second machine learning process employing at least one of a condition random field, Gaussian mixture model, or neural network, the second machine learning process running in parallel with the first machine learning process, if the speech signal includes words associated with an intended recipient of the user speech, and
   if the speech signal requests the action to be performed and if the intended recipient of the user speech is the electronic device, generate a command for the electronic device to perform the action, wherein the user speech and the speech signal do not include a wake-up phrase.

2. The device of claim 1, further comprising a sensor coupled to the controller to generate a sensor input to the controller.

3. The device of claim 2, wherein the sensor comprises at least one of an image sensor to generate image data; an audio sensor to receive the user speech; or a biometric sensor to generate biometric sensor data.

4. The device of claim 3, wherein the controller is further configured to determine the intended recipient based on at least one of the image data or the biometric sensor data.

5. The device of claim 3, wherein the controller is further configured to determine if the speech signal includes the words implying the action and if the words implying the action request the action to be performed based on at least one of the image data or the biometric sensor data.

6. The device of claim 1, wherein the controller is further configured to perform a database search based on the command.

7. The device of claim 1; wherein the controller is further configured to perform at least one of a World Wide Web search based on the command, input the command to a dialog engine, or input the command to a chat-bot.

8. The device of claim 1; wherein the controller is further configured to pass the command to an application program interface for execution.

9. The device of claim 1, wherein the electronic device is a kitchen appliance, a computer, a control system in a vehicle, a personal electronic device, or a home controller.

10. A computer-implemented method for context-aware query recognition in an electronic device, the method comprising:
    receiving user speech from an input device;
    generating a speech signal including applying the user speech to a statistical-based speech recognition algorithm, wherein the user speech and the speech signal do not include a wake-up phrase;
    determining, using a first machine learning process employing at least one of a condition random field, hidden Markov model, or neural network, if the speech signal includes words implying an action and determining whether the words implying the action request the action to be performed;
    determining an intended recipient of the user speech using a second machine learning process employing at least one of a condition random field, Gaussian mixture model, or neural network, the second machine learning process running in parallel with the first machine learning process; and
    if the speech signal requests the action to be performed and the intended recipient of the user speech is the electronic device, generating a command for the electronic device to perform the action.

11. The method of claim 10; further comprising receiving a sensor input comprising an image, audio or biometric data.

12. The method of claim 11, further comprising:
    determining if the speech signal includes the words implying the action and if the words implying the action request the action to be performed based on the sensor input.

13. The method of claim 11, further comprising:
    determining the intended recipient of the user speech based on the sensor input.

14. The method of claim 10, wherein determining if the speech signal includes the words implying the action and if the words implying the action request the action to be performed comprises:

receiving at least one of words or phonemes from the speech signal;

determining using the first machine learning process, if the words or the phonemes are action words or sounds; and outputting the action to be performed if the words or the phonemes request the action to be performed.

15. The method of claim 14, further comprising outputting a negative or a probabilistic indication if the words or the phonemes are not action words or sounds or do not request the action to be performed.

16. The method of claim 10, wherein determining the intended recipient of the user speech comprises:

receiving at least one of words or phonemes from the speech signal;

determining using the second machine learning process, if the words or the phonemes are associated with the electronic device; and if the words or phonemes are associated with the electronic device, outputting the an affirmative indication that the intended recipient of the user speech is the electronic device.

17. The method of claim 10, wherein determining the intended recipient of the user speech comprises:

receiving at least one of words or phonemes from the speech signal;

determining, using the statistically-based speech recognition algorithm, whether the words or the phonemes are associated with the electronic device; and if the words or phonemes are not associated with the electronic device, outputting a negative indication.

18. A computer-implemented method for context-aware query recognition in an electronic device, the method comprising:

receiving at the electronic device user speech from an input device;

generating a speech signal in response to the user speech by applying the user speech to a statistically-based speech recognition algorithm, wherein the user speech and the speech signal do not include a wake-up phrase;

analyzing the speech signal using a first machine learning process employing at least one of a condition random field, hidden Markov model, or neural network to determine if the speech signal includes at least one of words or phonemes indicating that the user speech was intended for the electronic device;

analyzing the speech signal using a second machine learning process employing at least one of a condition random field, Gaussian mixture model, or neural network, the second machine learning process running in parallel with the first machine learning process to determine if the speech signal includes at least one of words or phonemes implying an action and determining whether the words implying the action request an action; and generating a command for the electronic device based on the requested action.

19. The method of claim 18, further comprising forwarding the command to an application programming interface to execute the command in one of a kitchen appliance, a computer, a control system in a vehicle, a personal electronic device, or a home controller.

20. The method of claim 18, further comprising transmitting the command over an Internet connection to a server for performing a database search or a World Wide Web search.

21. At least one non-transitory computer-readable medium comprising instructions for executing context-aware query recognition in an electronic device that, when executed by a computer, cause the computer to:

receive user speech from an input device;

generate a speech signal including applying the user speech to a statistically-based speech recognition algorithm, wherein the user speech and the speech signal do not include a wake-up phrase;

determine using a first machine learning process employing at least one of a condition random field, hidden Markov model, or neural network, if the speech signal includes words implying an action and determine using the first machine learning process whether the words implying the action request the action to be performed;

determine an intended recipient of the user speech using a second machine learning process employing at least one of a condition random field, Gaussian mixture model, or neural network, the second machine learning process running in parallel with the first machine learning process; and if the speech signal requests the action to be performed and the intended recipient of the user speech is the electronic device, generate a command for the electronic device to perform the action.

22. The computer-readable medium of claim 21, wherein, when the instructions cause the computer to determine that the speech signal includes the words implying the action and that the words implying the action request the action to be performed, the instructions cause the computer to:

receive at least one of words or phonemes from the speech signal;

determine, using the first machine learning process, if the words or the phonemes are action words or sounds; and output the action to be performed if the words or the phonemes comprise the action to be performed.

23. The computer-readable medium of claim 21, wherein, when the instructions cause the computer to determine the intended recipient of the user speech, the instructions cause the computer to:

receive at least one of words or phonemes from the speech signal;

determine, using the second machine learning process, if the words or the phonemes are words or sounds associated with the electronic device; and if the words or phonemes are associated with the electronic device, output an affirmative indication that the intended recipient of the user speech is the electronic device.

24. The computer-readable medium of claim 21; wherein the instructions further cause the computer to determine the intended recipient of the user speech based on a sensor input.

25. The computer-readable medium of claim 24, wherein the instructions further cause the computer to determine the intended recipient of the user speech based on images from the sensor input.

* * * * *

UNITED STATES PATENT AND TRADEMARK OFFICE
CERTIFICATE OF CORRECTION

PATENT NO. : 10,147,423 B2  
APPLICATION NO. : 15/280809  
DATED : December 4, 2018  
INVENTOR(S) : Georges et al.

Page 1 of 1

It is certified that error appears in the above-identified patent and that said Letters Patent is hereby corrected as shown below:

In the Claims

In Column 12, Line 5, in Claim 3, delete "data;" and insert --data,-- therefor

In Column 12, Line 6, in Claim 3, delete "speech;" and insert --speech,-- therefor In Column 12, Line 20, in Claim 7, delete "claim 1;" and insert --claim 1,-- therefor In Column 12, Line 24, in Claim 8, delete "claim 1;" and insert --claim 1,-- therefor In Column 12, Line 35, in Claim 10, delete "statistical-based" and insert --statistically-based-- therefor In Column 12, Line 54, in Claim 11, delete "claim 10;" and insert --claim 10,-- therefor In Column 13, Line 35, in Claim 18, after "receiving", insert --,--

In Column 13, Line 35, in Claim 18, after "device", insert --,--

In Column 14, Line 54, in Claim 24, delete "claim 21;" and insert --claim 21,-- therefor Signed and Sealed this  
Twenty-eighth Day of April, 2020

Andrei Iancu  
*Director of the United States Patent and Trademark Office*